(12) United States Patent
Gettemy et al.

(10) Patent No.: US 8,217,911 B2
(45) Date of Patent: *Jul. 10, 2012

(54) DISPLAY WITH VISUALLY HOMOGENEOUS BORDER

(75) Inventors: Shawn Gettemy, San Jose, CA (US); Huy P. Nguyen, San Jose, CA (US); Bill Webb, Redwood City, CA (US); Lawrence Lam, San Jose, CA (US); Kean Wong, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

This patent is subject to a terminal disclaimer.

(21) Appl. No.: 12/360,653

(22) Filed: Jan. 27, 2009

(65) Prior Publication Data

US 2010/0026657 A1    Feb. 4, 2010

Related U.S. Application Data

(60) Continuation of application No. 10/863,312, filed on Jun. 7, 2004, now Pat. No. 7,483,016, which is a division of application No. 09/844,557, filed on Apr. 27, 2001, now Pat. No. 6,965,375.

(51) Int. Cl.
*G09G 5/00* (2006.01)

(52) U.S. Cl. .................. 345/173; 178/18.03; 178/18.05; 178/18.07; 439/74; 348/174

(58) Field of Classification Search .................. 345/173, 345/174; 361/683, 686; 439/74; 178/18.03, 178/18.05, 18.06, 18.07
See application file for complete search history.

(56) References Cited

U.S. PATENT DOCUMENTS

| 5,193,668 | A | * | 3/1993 | Fukuchi et al. | ............... | 200/512 |
| 5,626,483 | A | * | 5/1997 | Naitoh | ............................ | 439/74 |
| 5,920,310 | A | * | 7/1999 | Faggin et al. | ................. | 345/173 |
| 6,034,335 | A | * | 3/2000 | Aufderheide et al. | ........ | 200/5 A |
| 6,555,235 | B1 | * | 4/2003 | Aufderheide et al. | ........ | 428/447 |
| 6,587,097 | B1 | * | 7/2003 | Aufderheide et al. | ........ | 345/173 |
| 6,965,375 | B1 | * | 11/2005 | Gettemy et al. | ............. | 345/173 |
| 7,483,016 | B1 | * | 1/2009 | Gettemy et al. | ............. | 345/173 |

* cited by examiner

*Primary Examiner* — Lun-Yi Lao
*Assistant Examiner* — Tom Sheng

(57) ABSTRACT

A handheld device with a compact integrated touch panel is disclosed. A handheld device incorporating a touch panel display requiring electrical connections is reduced in size by incorporating electrical pathways within the support structure of the touch panel display, obviating the need for a flex circuit extension from the touch panel display for connection to the handheld device. A further reduction in size is obtained by providing an inherent visually homogeneous perimeter for the touch panel display by matching the colors of the conductive and dielectric materials, thereby eliminating the need for a bezel.

14 Claims, 10 Drawing Sheets

DISPLAY WITH VISUALLY HOMOGENEOUS BORDER

RELATED APPLICATIONS

This Application is a Continuation of U.S. patent application Ser. No. 10/863,312, now U.S. Pat. No. 7,483,016, filed Jun. 7, 2004, which in turn was a Divisional application of U.S. patent application Ser. No. 09/844,557, now U.S. Pat. No. 6,965,375, filed on Apr. 27, 2001, to Gettemy et al., which are hereby incorporated herein by reference in their entireties.

FIELD OF THE INVENTION

The present claimed invention relates to the field of touch panel displays. More particularly, the present claimed invention relates to touch panel displays that may be used for handheld devices.

BACKGROUND ART

Over the years, many electronic instruments and devices and been sufficiently reduced in size to become portable, and in turn, small enough to be held and operated in the hand of the user. The advent of integrated circuits greatly increased the number of devices that could achieve portability and handheld status, as well as increasing the functionality of such devices.

Earlier handheld devices such as measuring instruments or electronic calculators had minimal requirements for display capability and much of the available area on the package of the device was dedicated to controls such as knobs and buttons, or a keypad. For such instruments, a display capable of handling up to a dozen or so alphanumeric characters was sufficient.

As the information processing capabilities of handheld devices have grown, the types of information and data that can be displayed thereon has expanded. For electronic calculators, alphanumeric displays have been supplemented by displays that are capable of graphically representing mathematical functions.

As handheld calculators acquired more sophisticated display capabilities, they have evolved into palmtop computer systems that provide text processing and communications applications. Palmtop computer systems are commonly used to implement various Personal Information Management (PIM) applications such as an address book, a daily organizer, and electronic notepads.

The competing interests of increasing functionality and small size in handheld devices have led to the adoption of touch panel displays that provide a shared surface for input and output functions. Touch panel displays are typically multilayer structures combining a transparent means of sensing the position and possibly the magnitude of a contact local to the display surface with an underlying display.

Most touch panel displays use an electronic means of sensing input; analog-resistive, matrix-resistive, capacitive and near field imaging (NFI) are examples of current technologies. Depending upon the technology used, a touch panel may require several distinct electrical connections to accommodate drive and sense signals to one or more transparent electrode layers.

Touch panel displays are extremely versatile in that a limitless variety of "virtual buttons" can be displayed for user input. A palmtop computer employing a touch panel display can easily modify the areas of the display dedicated to input and output in response to the immediate requirements of the user and the application. Thus, for handheld devices that incorporate a touch panel display, it is desirable to maximize the usable area of the display within the size constraint of being handheld. Further, since not all hands are of the same size, there is a general rule that smaller is better and this applies to width and length as well as height. Ideally, the difference in width and length between the touch panel display and the underlying structure of the handheld device is kept to a minimum.

In spite of the fact that it is desirable to maximize the area available for touch panel displays, a portion of the perimeter of typical touch panel displays used in handheld devices is lost due to the manner in which they are integrated into the handheld device.

For instance, a bezel or faceplate is commonly used to hold the touch panel in place and mask its perimeter. The mechanical function of securing the touch panel in place is relatively straightforward. The second function of a bezel is less than obvious in that its purpose is hidden by design. The sensing portion of touch panel displays typically has a non-transparent electrical structure on its perimeter that includes conductive traces and insulation between layers. The geometry and coloration of the conductive and dielectric materials are such that they are typically visually non-homogeneous and require masking by the bezel.

Aesthetics aside, it is desirable to have a neutral, homogeneous perimeter surrounding the touch panel display to minimize visual distraction from the display itself. Due to the limited display size and the variety of environments in which a handheld device may be used, it is important to give the user every assistance in viewing the display. In typical handheld devices, a bezel achieves the desired homogeneous perimeter by hiding the non-homogeneous pattern beneath it. However, the use of a bezel dictates an unwanted increase in the overall thickness of the handheld device over that which could be obtained for a flush-mounted touch panel display, and may also contribute to an increase in the length and width as well.

Thus, a need exists for a touch panel display that can be integrated into a handheld device without requiring a bezel and its associated increase in overall device dimensions. There is also a need for a flush mounted touch panel display that presents a visually homogeneous border to the user without the use of a bezel.

SUMMARY

Accordingly, several embodiments of the present invention include structures that enable particular reductions in the overall dimensions of handheld devices. For example, the elimination of a bezel provides a direct decrease in height of the device. Further, the elimination of the bezel enables a reduction in the width and length of a handheld device. Another embodiment of the invention enables the length or width of the touch panel display to establish the maximum width and length of the underlying portion of a handheld device. Another aspect of the invention enables the aforementioned reductions in dimensions without impairing the visual characteristics of the touch panel display.

In an embodiment of the present invention, electrical connection between the touch panel display and the remainder of the handheld device is established within the projected outline of the touch panel display. That is, when viewed from above, no portion of the handheld device extends beyond the perimeter of the touch panel display. For a rectangular device, any or all of the four sides may be flush with the edge of the touch panel display.

In another embodiment of the present invention, the entire upper surface of the touch panel display is visible and there may or may not be an extension of the remaining portion of the device above the top surface of the touch panel display.

In still another embodiment of the invention, distributed local electrical connections are made between the touch panel display and the handheld device, thereby minimizing the length of bus traces used on the touch panel display.

The embodiments described herein enable the reduction in size of a handheld device having a touch panel display. This reduction in size is achieved by incorporating electrical pathways within the support structure of the touch panel display, obviating the need for a flex circuit extension from the touch panel display for connection to the handheld device. A further reduction in size is obtained by providing an inherent visually homogeneous perimeter for the touch panel display by matching the colors of the conductive and dielectric materials, thereby eliminating the need for a bezel.

DETAILED DESCRIPTION

Figure 1:
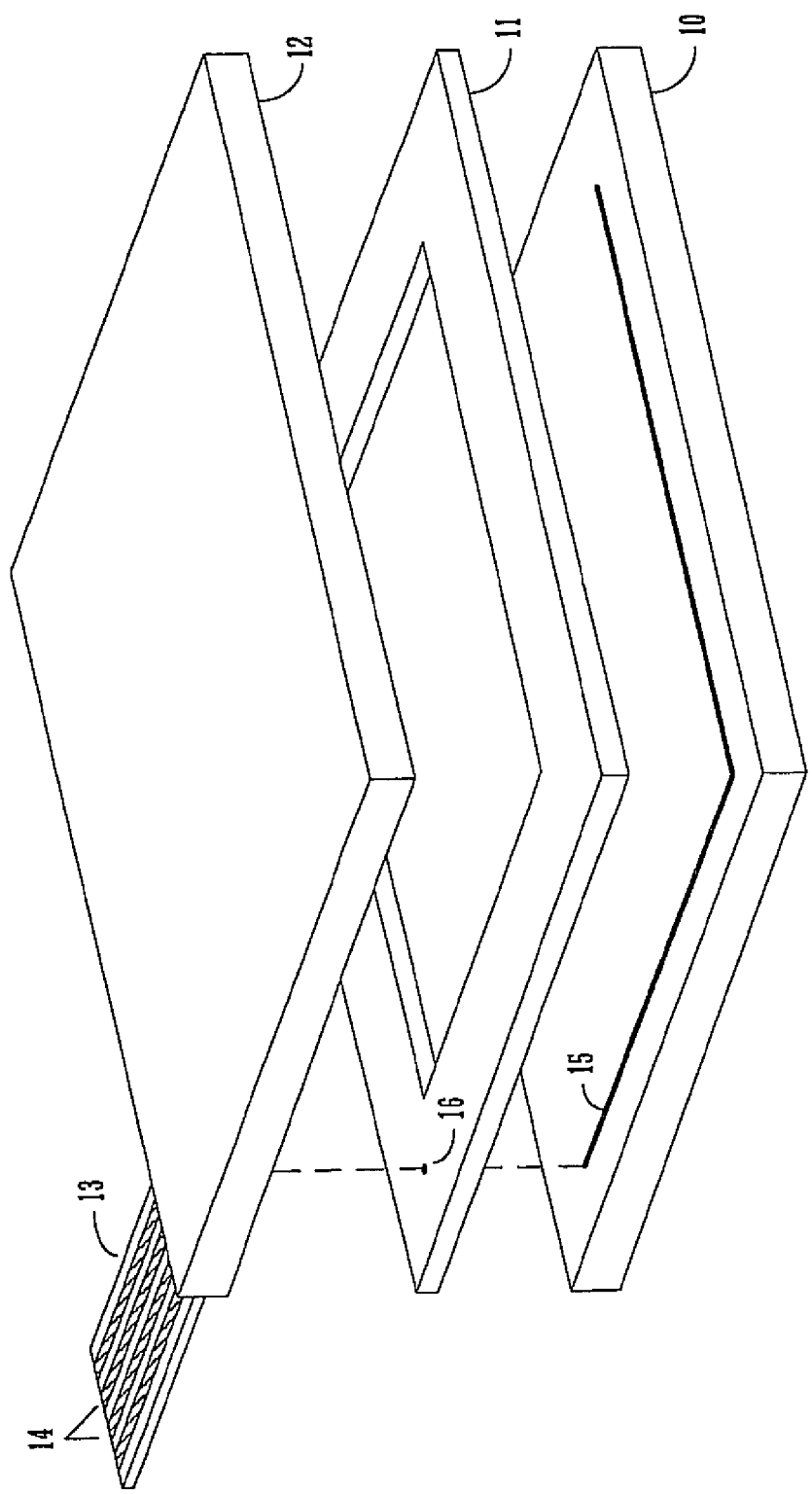
FIG. 1 shows an exploded view of a typical plastic/glass resistive touch panel.

An exploded schematic view of a representative resistive touch screen with film-on-glass is shown in FIG. 1. A lower contact electrode 10 is separated from an upper contact electrode 12 by an adhesive dielectric spacer 11. The lower contact electrode 10 is constructed of a glass substrate with a transparent conductive coating of indium tin oxide (ITO). The adhesive dielectric spacer 11 serves to bond electrodes 11 and 12 together while maintaining electrical isolation between the two electrodes. The upper contact electrode 12 is constructed from a polyester film having a transparent conductive ITO coating on its lower surface as well as a low resistance conductive bus pattern.

A flex circuit tail 13 is attached to the upper contact electrode 12. The flex circuit tail 13 has a plurality of embedded conductors 14. It should be noted that the flex circuit tail is a feature common to many touch panel technologies in addition to the representative resistive touch panel shown in FIG. 1. Also, a flex circuit tail may contain a varying number of conductors and be attached to more than one electrode. The use of a flex circuit tail is the standard means of establishing electrical contact for drive and/or sense functions.

The lower contact electrode in FIG. 1 has a conductive trace 15 on its upper surface that is aligned with a conductive via 16 that traverses the adhesive dielectric spacer 11. The use of vias in a dielectric layer that separates opposing electrodes allows external contact to a single electrode to distribute signals to both of the opposing electrodes.

The present invention applies to all touch panel displays having an electrically active transparent element. For purposes of this disclosure, an electrically active transparent element is defined as a transparent substrate with a transparent conductive coating that is part of an electronic circuit used to sense input to the touch panel.

Figure 2:
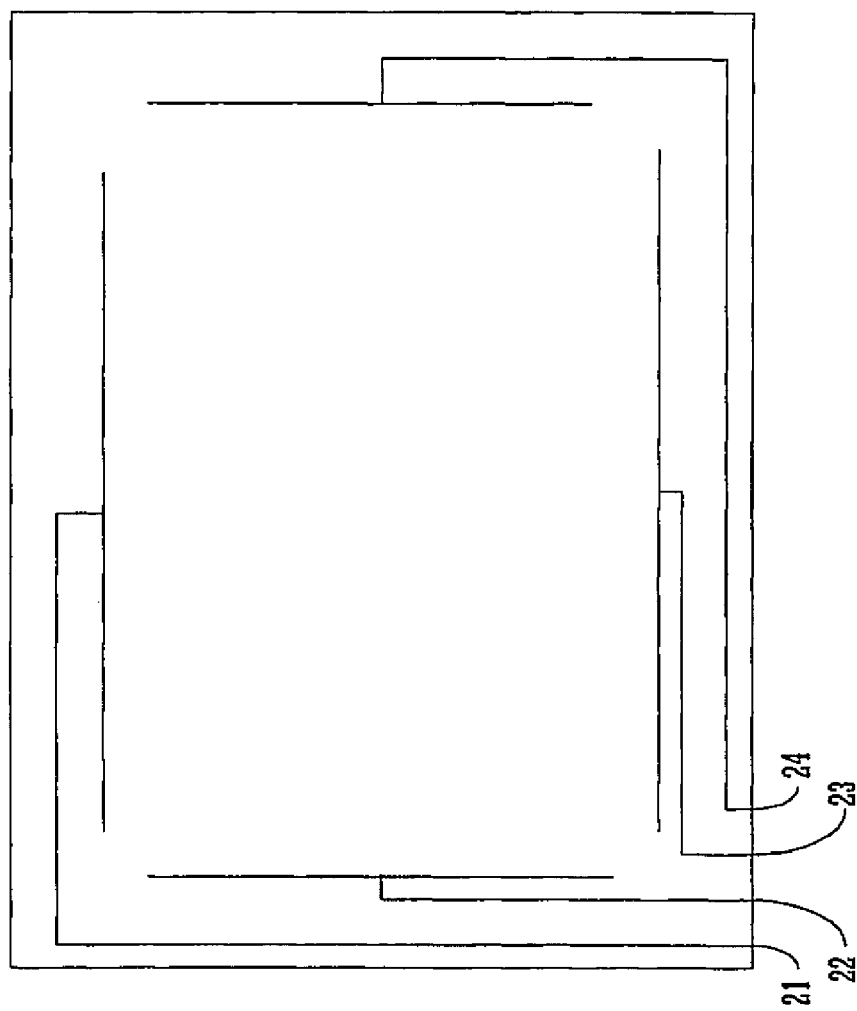
FIG. 2 shows a top view of a typical trace pattern.

FIG. 2 illustrates a bus pattern disposed on the lower surface of the upper contact electrode 12. Traces 21 and 23 provide current to the transparent conductive ITO coating on one axis, and traces 22 and 24 provide current along a second orthogonal axis. The bus pattern is typically printed on the upper contact electrode using a conductive ink consisting of an organic binder and a metallic filler. Non-transparent conductive inks provide a lower resistance than that obtainable with transparent conductive coatings, and thus are better suited for bus patterns. Transparent conductive coatings typically have a transmittance of greater than 80%.

Since most touch panel display technologies have drive and/or sense traces on at least two opposing edges, an appreciable amount of the display perimeter is subject to visual inhomogeneity.

Figure 3:
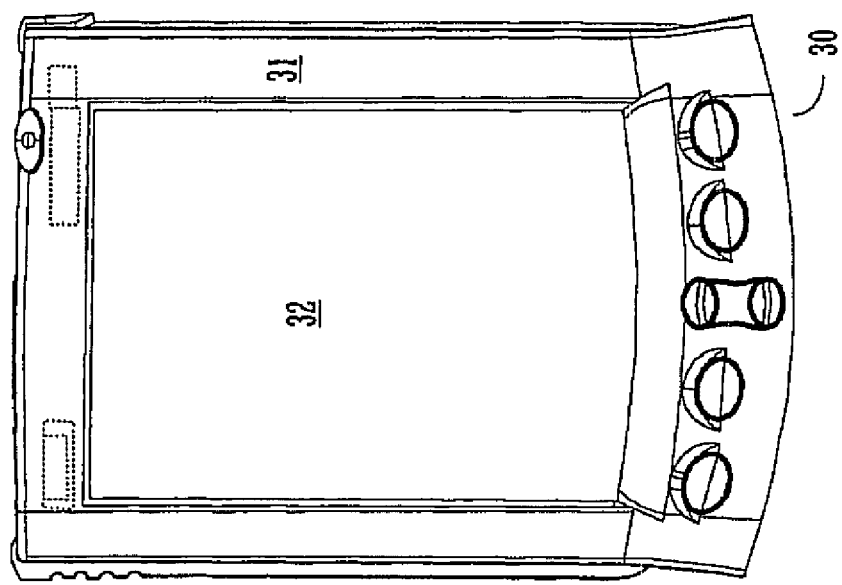
FIG. 3 shows a handheld device with a bezel.
Figure 4:
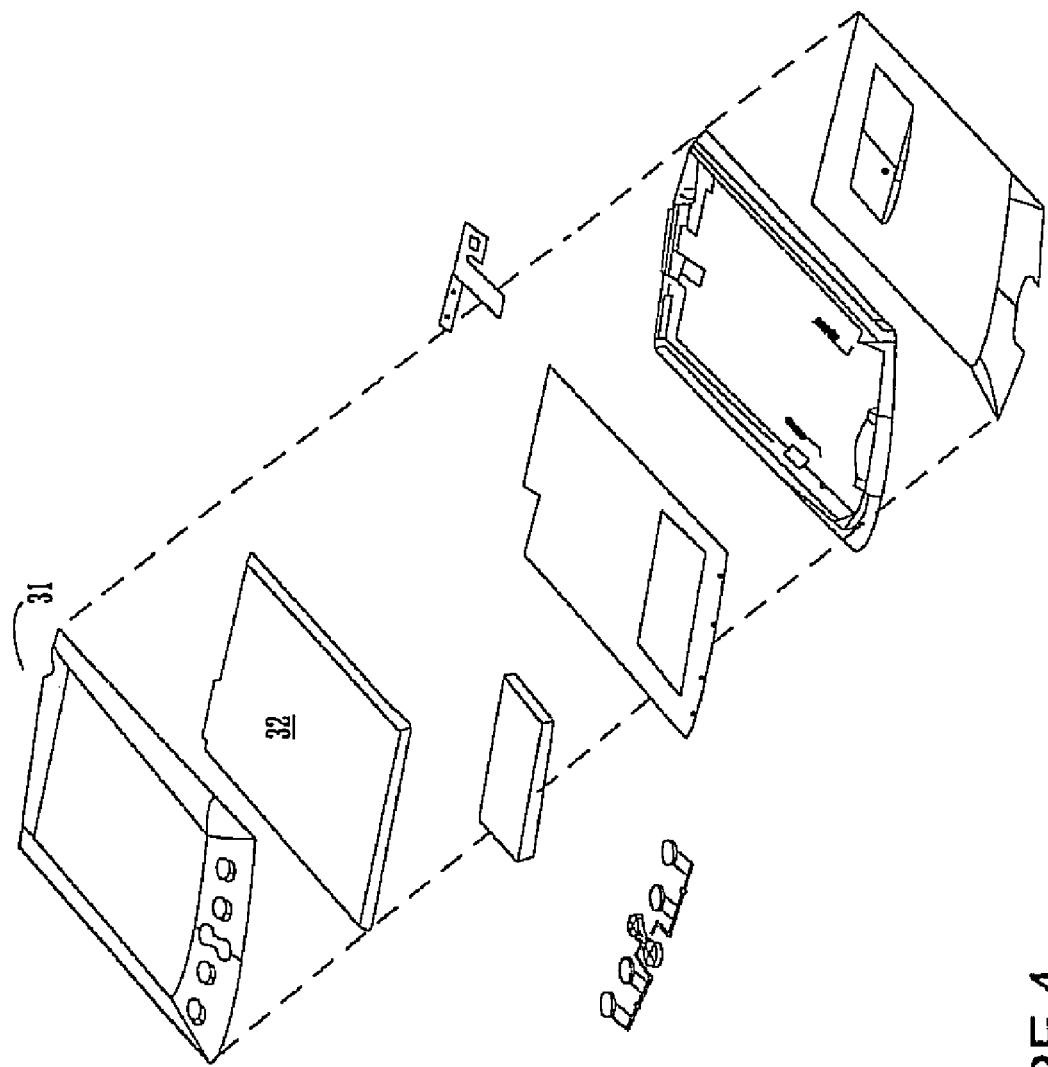
FIG. 4 shows a an exploded view of a typical handheld device assembly

FIG. 3 illustrates a typical handheld device 30 incorporating a touch panel display 32 and a bezel 31. FIG. 4 shows an exploded view of the handheld device of FIG. 3.

In an embodiment of the present invention, the adhesive dielectric spacer 11 shown in FIG. 1 and the bus pattern shown in FIG. 2 are selected such that the visual contrast between the bus pattern and the adhesive dielectric spacer 11 is minimized in the assembled display. In other words, these objects are made to be the same or similar in color.

The minimization of the visual contrast can be achieved by additives to either the conductive ink used to print the bus pattern or the adhesive dielectric spacer, or both. The additive may be an organic dye that is soluble in the carrier or binder used in the conductive ink or adhesive dielectric spacer, or it may be a finely divided solid pigment. For example, a black dye may be added to the dielectric spacer, and finely divided carbon may be added to the conductive ink.

The present invention is applicable to any touch screen technology that includes at least one transparent substrate having a transparent conductive coating, that requires both electrical connection and isolation at the same surface.

Figure 5:
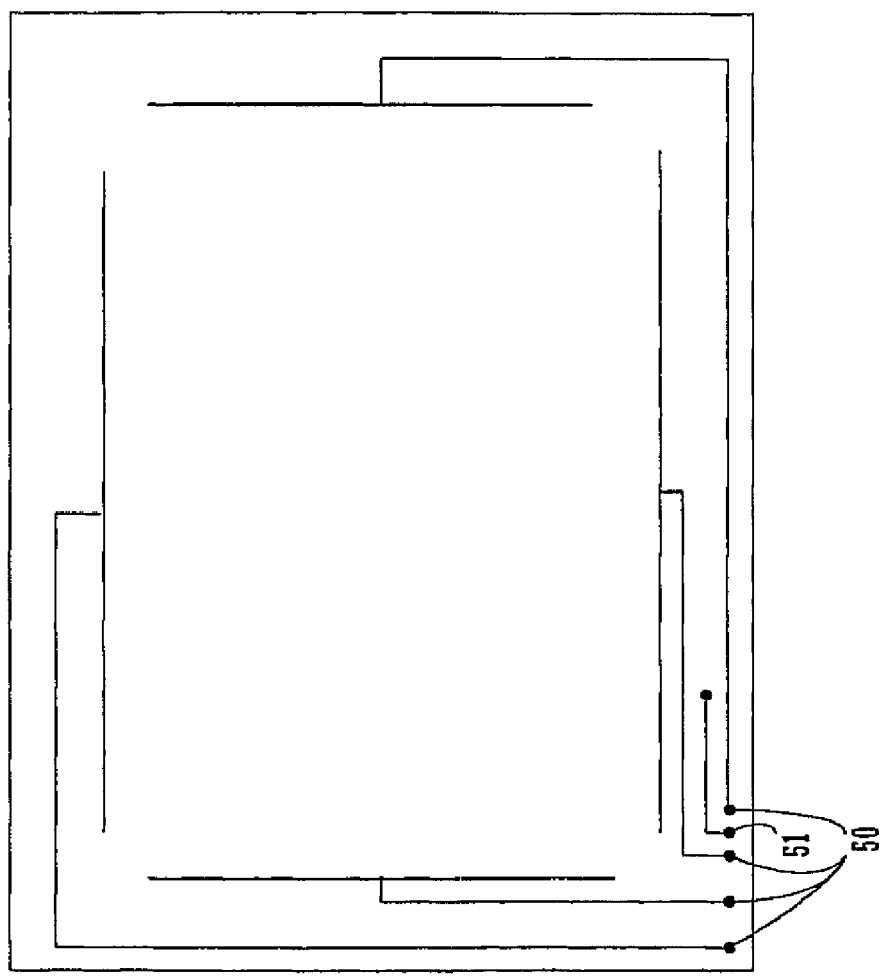
FIG. 5 shows a touch panel with on-film contacts.

FIG. 5 shows a touch panel substrate similar to that of FIG. 2 but without a flex circuit tail. In place of the flex circuit tail there is an array of contact points 50. The array of contact points 50 establishes connections to the bus traces on the substrate. A contact point 51 establishes contact to a short trace that aligns with a via in an adjacent dielectric spacer (not shown). The construction of the array of contact points depends upon the method used to attach the substrate to the remainder of the device and the method for establishing electrical contact with the contact points. The contact points may be extensions of the bus traces with a particular desired geometry, or they may formed of an added material such as electroplated metal. Electrical contact may be established with the array of contact points by adhesive or by pressure. The array of contact points allows for local electrical contact with conductors located in the support structure of the touch panel.

Figure 6:
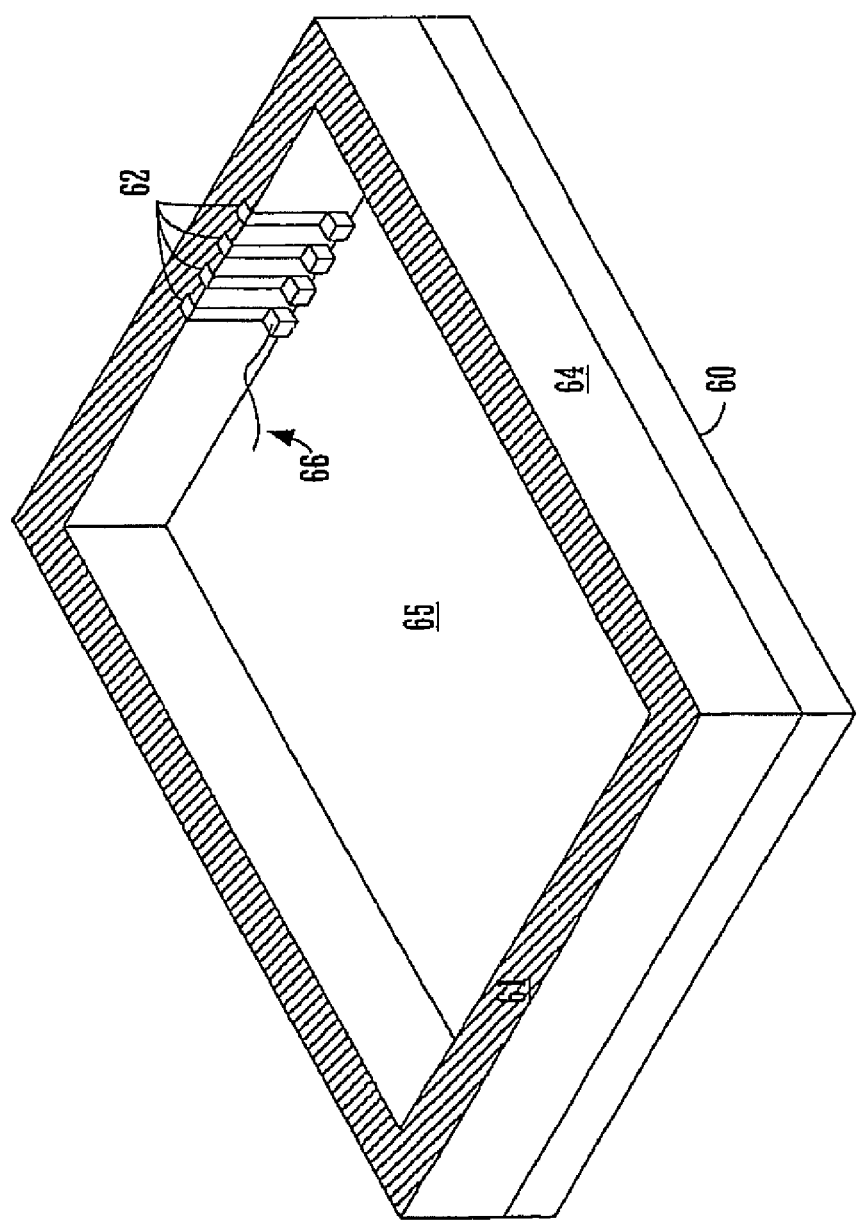
FIG. 6 shows a carrier frame with embedded contacts.

FIG. 6 shows a simple housing 60 including a carrier frame 64 with an upper planar display mounting surface 61 and a floor 65. The housing 60 may be of monolithic construction or assembled from a number of parts. The carrier frame 64 is the part of the housing to which the touch panel display is mounted. The carrier frame 64 is preferably made from a dielectric material such as a thermosetting resin.

Embedded in one wall of the carrier frame 64 is an array of frame contacts 62. The array of frame contacts may be molded in place, press fit into a groove, or otherwise embedded. Each frame contact is an electrical conductor. The upper end of each contact is adapted to establish contact to a corresponding contact point on touch panel element such as that shown in FIG. 5.

The upper end of the frame contact may be slightly vertically offset from the planar mounting surface 61. For example, a spring contact or a contact intended for use with particular anisotropic conductive adhesives would preferably be offset above the planar mounting surface 61. The lower end of each contact point is adapted for establishing contact to a circuit element within the confines of the housing 60.

An example of such an adaptation for establishing contact to a circuit element is a flying lead 66 comprising a copper wire with a suitable surface finish for soldering, epoxy bonding, welding, etc. Depending upon the overall design of the handheld device, there are many alternatives for establishing contact between the upper surface of the frame contacts and the contact points on the touch panel. For fine geometries, the connection can be made using an anisotropic conductive film (ACF) or anisotropic conductive adhesive (ACA) to prevent lateral short circuits. For coarse geometries, conventional conductive adhesives can be used in conjunction with non-conducting adhesives to attach a touch panel to the surface 61.

Adhesives for use in sealing to surface 61 include thermoplastic and thermosetting adhesives. Alternatively, a combination of direct heat seal between electrically non-conducting surfaces and electrically conductive adhesives can be used.

When the use of an adhesive is not required, the frame contacts 62 can be spring elements that provide electrical contact without bonding. Although the embodiment of FIG. 6 shows a group of frame contacts embedded in one wall, the frame contacts may be distributed over more than one wall, allowing an effective rerouting of circuit paths on the touch panel display.

Figure 7:
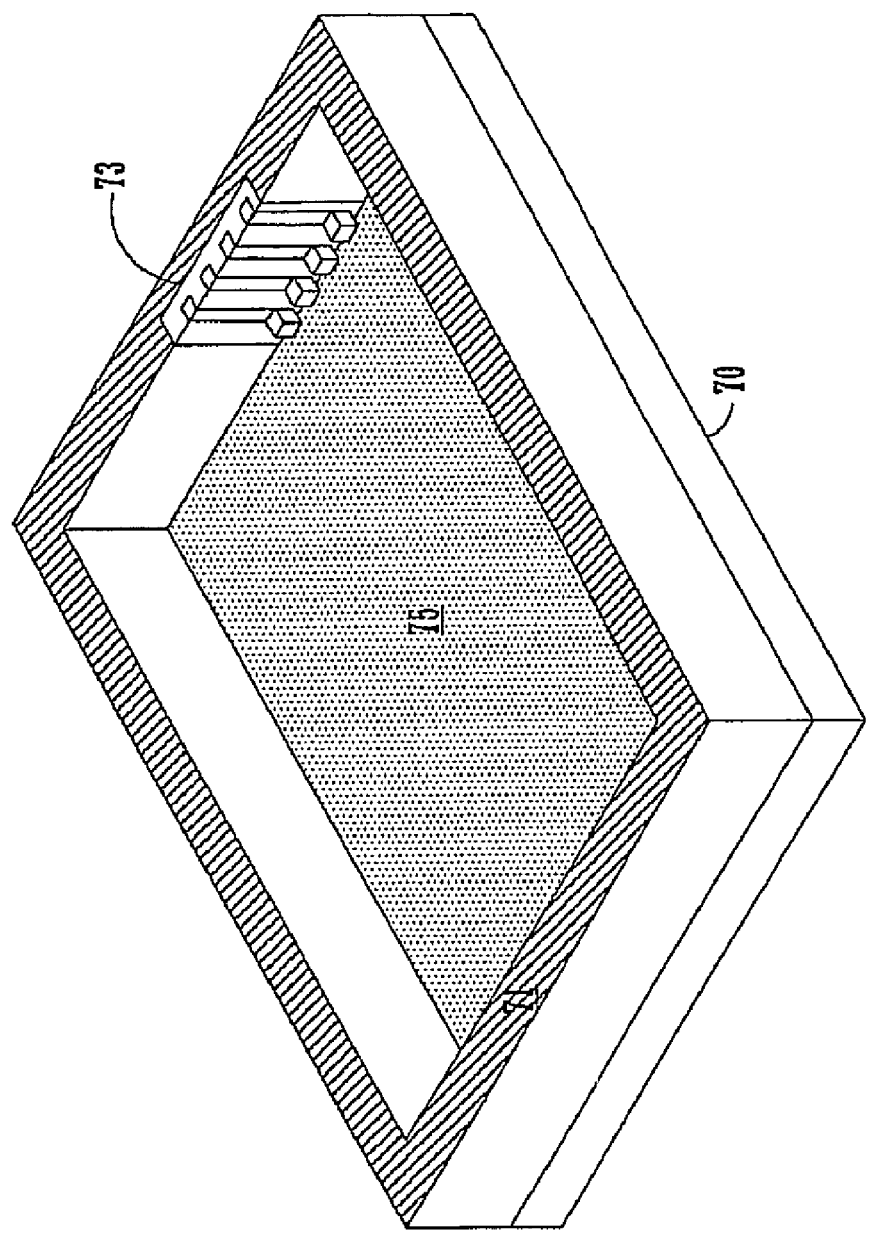
FIG. 7 shows a carrier frame with contact block insert.

FIG. 7 shows a housing similar to that of FIG. 6, but in this case the frame 70 is fabricated from a conductive material such as aluminum or magnesium. The array of frame contacts is embedded in a dielectric insert block 73 which is in turn mounted in the frame 70. The use of a dielectric insert block is preferred when a conductive housing is used or greater precision is desired in the alignment of the frame contacts.

Figure 8:
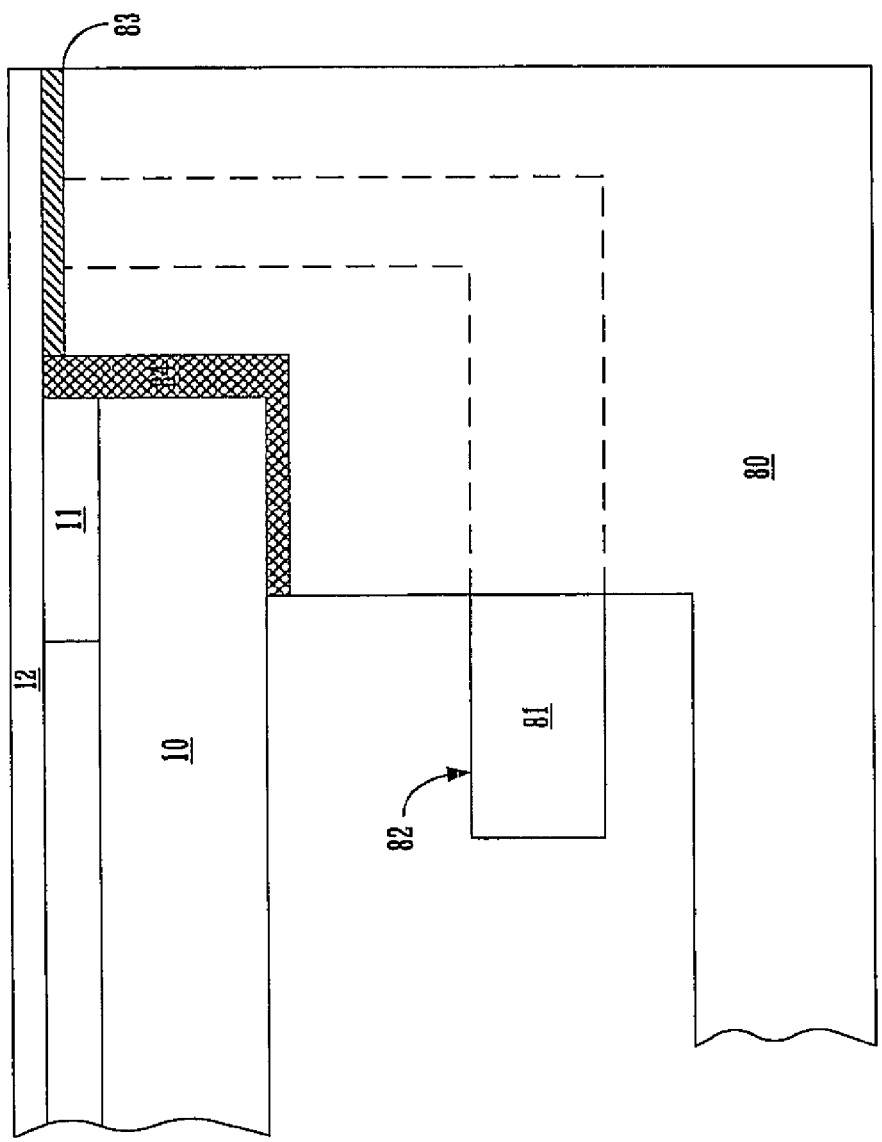
FIG. 8 illustrates the mounting details for an exemplar embodiment of the invention incorporating a resistive touch panel display.

FIG. 8 shows an embodiment of the present invention as applied to a film-on-glass resistive touch panel display. The upper contact electrode 12 extends beyond the adhesive dielectric spacer 11 and the lower contact electrode 10, allowing the electrical connection to be made to the frame contact 81. An electrically conductive material 83 is used to bond the upper surface of the frame contact 81 to its corresponding contact point on the upper contact electrode 12. Further bonding between the touch panel display and the frame is established by the adhesive 84 that is disposed in the gap between the touch panel display and the step feature of the frame 80. This embodiment is preferred when the upper contact electrode is very thin and flexible and additional support is desired.

Figure 9:
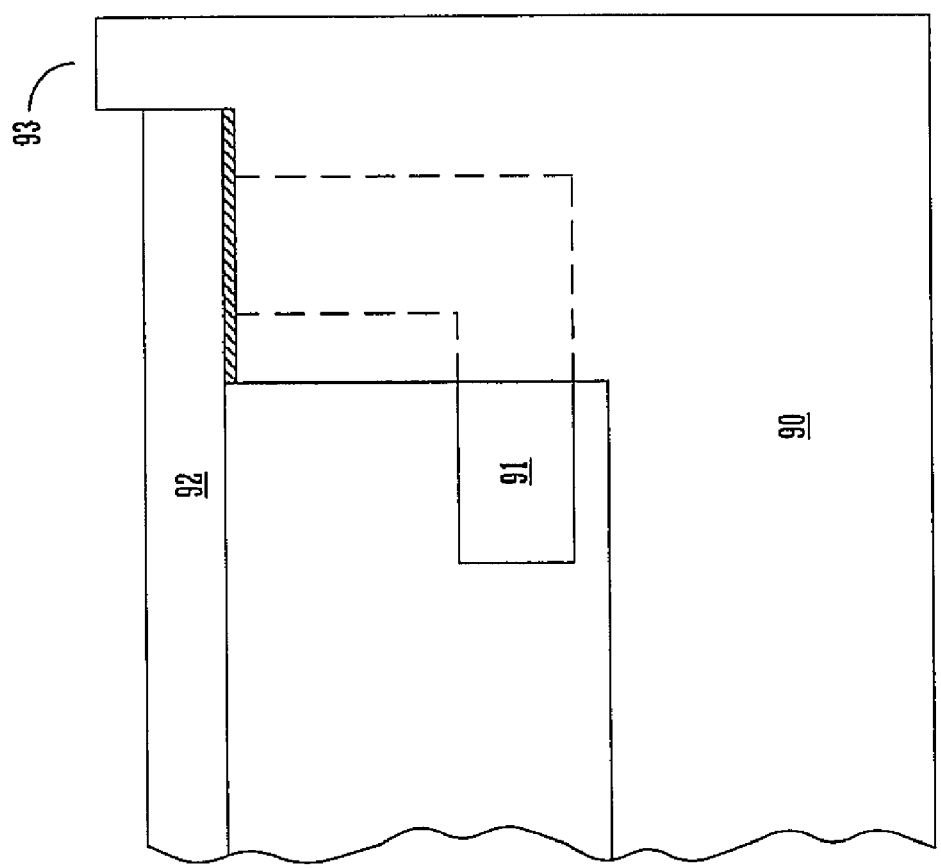
FIG. 9 illustrates the mounting details for an exemplar embodiment of the invention incorporating a NFI touch panel display.

FIG. 9 shows an embodiment of the present invention incorporating a near field imaging (NFI) display. The frame 90 has a protective rim 93 that serves to shield the edge of the NFI glass substrate 92. The optional protective rim 93 provides protection without occluding the display.

Figure 10:
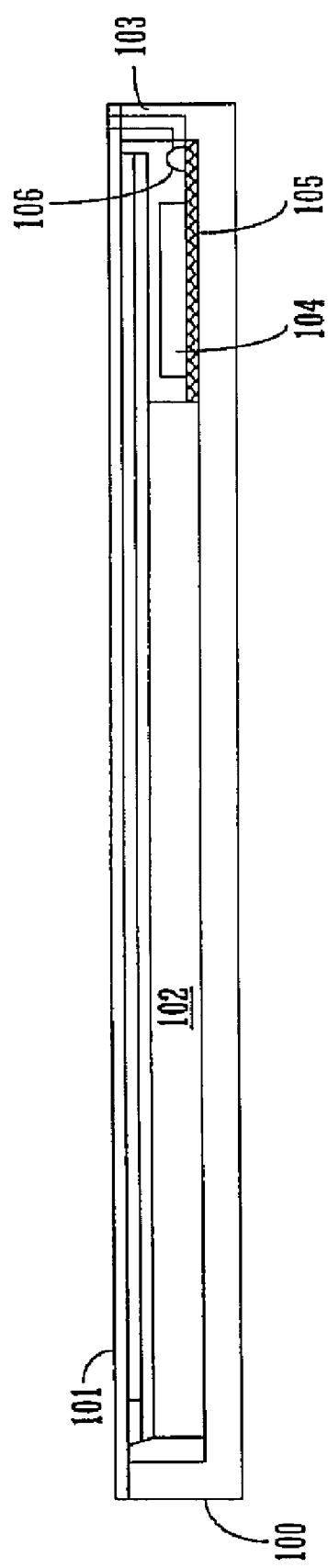
FIG. 10 shows a cross-section of a handheld device in accordance with one embodiment of the present claimed invention.

FIG. 10 shows a cross-section of a handheld computing device using the frame contact of the present invention. A carrier frame 100 with an integrated bottom supports a display 102, flex circuit 105 and a touch panel 101. The display 102 may be a liquid crystal display (LCD), an electronic paper display, or other suitable display. The flex circuit 105 supports and is connected to an integrated circuit 104. The flex circuit 105 may also be a printed circuit using a rigid substrate. The flex circuit 105 is also connected to a frame contact 103 by a lead 106. The flex circuit 105 provides electrical connection between the integrated circuit 104, and the lead 106 and display 102. The frame contact 103 is electrically connected to the touch panel 101. The integrated circuit 104 receives input signals from the touch screen 101 and outputs drive signals to the display 102. The integrated circuit 104 may process the input signals from the display, as well as other inputs, e.g. signals from a probe or communications link connected by means of a jack mounted in the frame 100 (not shown), or an antenna.

The embedded frame contact of the present invention provides increased flexibility of touch panel bus trace layout since it obviates the need for a flex circuit tail. When combined with the use of vias through dielectric spacers, the frame contacts of the present invention can be used to distribute electrical signals to all electrically active layers in a touch panel. The embedded frame contact can be used at any point on the frame perimeter. Electrical traces that were previously printed onto the touch panel display can be replaced by the combination of a frame contact and a wire routed in the interior of the housing. Handheld computers, test instruments and communications devices are examples of devices in which the present invention may be incorporated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A touch panel display comprising:
    at least one electrically active transparent element having a first surface and a second surface;
    a transparent conductive coating disposed on a portion of said first surface;
    a non-transparent conductive pattern disposed on said first surface wherein said non-transparent conductive pattern is electrically coupled to said transparent conductive coating, said non-transparent conductive pattern having at least one contact point to electrically couple to a circuit through an array of frame contacts in a housing; and
    a dielectric material adjacent to said non-transparent conductive pattern;
    wherein said non-transparent conductive pattern and said dielectric material have an approximately equal visual homogeneous appearance when viewing through said at least one electrically active transparent element from said second surface to said first surface.

2. The touch panel display of claim 1 wherein said non-transparent conductive pattern comprises a material selected to provide coloration.

3. The touch panel display of claim 1 wherein said dielectric material comprises a material selected to provide coloration.

4. The touch panel display of claim 3 wherein said non-transparent conductive pattern comprises a material selected to provide coloration.

5. The touch panel of claim 1 wherein said touch panel display is a resistive touch panel display.

6. The touch panel of claim 1 wherein said touch panel display is a near field imaging touch panel display.

7. A handheld device comprising:
   a touch panel including,
      a first sensing and display layer having a non-transparent conductive pattern disposed along a border of the touch panel,
      a second sensing and display layer,
      a spacer layer disposed between the first and second sensing and display layers along the border of the touch panel,
      wherein the non-transparent conductive pattern and the spacer layer have an approximately equal visual homogeneous appearance when viewing the second sensing and display layer through the first sensing and display layer; and
   a housing including an array of frame contacts distributed along a wall of the housing and electrically coupling a corresponding contact point on the touch panel to a circuit disposed in the housing.

8. The handheld device of claim 7, further comprising:
   the housing having an upper planar display mounting surface.

9. The handheld device of claim 7, further comprising:
   an adhesive layer disposed between the touch panel and the housing.

10. The handheld device of claim 7, further comprising:
    a dielectric insert block disposed between the housing and the array of frame contacts.

11. The handheld device of claim 10, wherein the housing is a conductive material.

12. The handheld device of claim 7, wherein: the first sensing and display layer extends beyond the spacer layer and second sensing and display layer so that the contact points of the non-transparent conductive pattern are coupled to the array of frame contacts; and the adhesive layer disposed between the second sensing and display layer and a step feature of the housing.

13. The handheld device of claim 7, wherein the housing includes a protective rim to shield the edge of the first sensing and display layer without occluding viewing of the touch panel.

14. The handheld device of claim 7 wherein the approximately equal visual homogeneous appearance of the non-transparent conductive pattern and the spacer layer comprises an approximately equal coloration.

* * * * *